(12) United States Patent
Buesing et al.

(10) Patent No.: US 10,829,214 B2
(45) Date of Patent: Nov. 10, 2020

(54) ELASTIC TORSION ELEMENT FOR CONNECTING A ROTOR BLADE TO A ROTOR HUB OF A ROTOR

(71) Applicant: AIRBUS HELICOPTERS DEUTSCHLAND GMBH, Donauworth (DE)

(72) Inventors: Moritz Buesing, Augsburg (DE); Rupert Pfaller, Riemerling (DE); Martin Ortner, Unterhaching (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 161 days.

(21) Appl. No.: 16/143,774

(22) Filed: Sep. 27, 2018

(65) Prior Publication Data
US 2019/0112040 A1    Apr. 18, 2019

(30) Foreign Application Priority Data
Oct. 12, 2017 (EP) ..................................... 17400057

(51) Int. Cl.
*B64C 27/48* (2006.01)
*B64C 27/33* (2006.01)
*B64C 27/473* (2006.01)

(52) U.S. Cl.
CPC .............. *B64C 27/48* (2013.01); *B64C 27/33* (2013.01); *B64C 2027/4736* (2013.01)

(58) Field of Classification Search
CPC .. B64C 27/33; B64C 27/48; B64C 2027/4736
See application file for complete search history.

(56) References Cited

U.S. PATENT DOCUMENTS

| 5,263,821 A | 11/1993 | Noehren et al. |
| 6,805,948 B2 * | 10/2004 | Yasui ...................... B64C 27/33 |
| | | 416/136 |
| 8,061,991 B2 | 11/2011 | Metivier |

(Continued)

FOREIGN PATENT DOCUMENTS

| CA | 2650760 A1 | 7/2009 |
| EP | 1431176 A1 | 6/2004 |
| EP | 2832640 A1 | 2/2015 |

OTHER PUBLICATIONS

European Search Report for European Application No. EP17400057, Completed by the European Patent Office, dated Feb. 24, 2018, 5 pages.

*Primary Examiner* — Richard A Edgar
(74) *Attorney, Agent, or Firm* — Brooks Kushman P.C.

(57) ABSTRACT

An elastic torsion element for connecting a rotor blade to a rotor hub of a rotor, the elastic torsion element comprising at least two elastically deformable plates, wherein each one of the at least two elastically deformable plates comprises fiber reinforced polymers, wherein respective fibers of the fiber reinforced polymers of each one of the at least two elastically deformable plates are at least arranged along one of a first and a second dominant fiber directions, wherein the first dominant fiber direction crosses the second dominant fiber direction in a predetermined fiber direction crossing region, and wherein the elastic torsion element comprises an integrated elastic lead-lag hinge that is formed at the predetermined fiber direction crossing region.

20 Claims, 6 Drawing Sheets

(56) References Cited

U.S. PATENT DOCUMENTS

| | | |
|---|---|---|
| 8,591,197 B2 | 11/2013 | Metivier |
| 8,821,128 B2 | 9/2014 | Bianchi et al. |
| 2010/0278648 A1 | 11/2010 | Kuntze-Fechner et al. |
| 2012/0031544 A1 | 2/2012 | Metivier |
| 2015/0158582 A1 | 6/2015 | Buesing |

* cited by examiner

ELASTIC TORSION ELEMENT FOR CONNECTING A ROTOR BLADE TO A ROTOR HUB OF A ROTOR

CROSS-REFERENCE TO RELATED APPLICATIONS

This application claims priority to European patent application No. EP 17400057.0 filed on Oct. 12, 2017, the disclosure of which is incorporated in its entirety by reference herein.

BACKGROUND OF THE INVENTION

(1) Field of the Invention

The invention is related to an elastic torsion element for connecting a rotor blade to a rotor hub of a rotor. The invention is further related to a rotary wing aircraft with a rotor that comprises such an elastic torsion element.

2) Description of Related Art

In bearingless or hinge- and bearingless rotor systems, elastic torsion elements are used to connect rotor blades of a multi-blade rotor of a rotary wing aircraft to an associated rotor hub or shaft of the aircraft. During operation, i.e. rotation of the multi-blade rotor, a respective elastic torsion element must withstand tremendous centrifugal forces that the rotor blades apply thereto, while permitting their flapping, pitch and lead-lag motions.

Such an elastic torsion element is usually implemented by means of a so-called "flexbeam" element. In general, a flexbeam element is a special, in particular fiber reinforced composite material element that is flexible enough in bending without discrete hinges, in the case of a hingeless rotor system, or in bending and in torsion to allow twisting for blade movement without bearings, in the case of a bearingless rotor system.

A flexbeam element usually realizes a flapwise-soft region that enables flapping of the associated rotor blade in the vertical direction, i.e. rotation of the associated rotor blade out of the respective rotation plane defined by the given multi-blade rotor. Thus, the flapwise-soft region constitutes a fictitious horizontally oriented axis, a so-called virtual flapping hinge, about which the associated rotor blade flaps, i.e. executes upward and downward flapwise motions in a bearingless or a hinge- and bearingless rotor system. Furthermore, only in a bearingless rotor system, the flexbeam element usually comprises a torsion weak region that enables torsion, i.e. rotation of the associated rotor blade around its respective rotor blade axis. Moreover, the flexbeam element usually possesses a lead-lag-soft region that permits motions of an associated rotor blade in a bearingless or a hinge- and bearingless rotor system in the lead-lag direction. The lead-lag-soft region thus constitutes a fictitious vertically oriented axis, a so-called virtual lead-lag hinge, about which the rotor blade executes forward and backward lead-lag motions, i.e. rotation of the associated rotor blade within a respective rotation plane defined by a given multi-blade rotor. Usually, the lead-lag-soft region and the torsion weak region are arranged between the flapwise-soft region and a respective rotor blade attachment, where the associated rotor blade is attached, or a transition zone into an aerodynamic profile that forms the associated rotor blade.

Generally, it is advantageous to realize the lead-lag-soft region and a torsion weak region such that the lead-lag-soft region is integrated into the torsion weak region which is, preferably, resistant against excessive deformation and buckling deformation under flapping loads without additional supports, such as e.g. a specific flap stop. Consequently, such a torsion weak region with integrated lead-lag-soft region leads to transition from a shape with high lead-lag stiffness and low flapping stiffness into a shape with low lead-lag stiffness and high flapping stiffness, due to its arrangement between the flapwise-soft region and the respective rotor blade attachment. However, respective flexbeam elements are usually rather complex and consist of composite components that are very elaborate and difficult to manufacture. Thus, these composite components are generally expensive.

The document EP 1 431 176 A1 describes a flexbeam element with flapping portions and lead-lag and feathering portions. Each lead-lag and feathering portion has a central portion with an elongated and narrow width; middle portions each of which continuously connects to the central portion and branches from both ends of the central portion extending along the longitudinal direction thereof, and extends upward and downward; and edge portions each of which continuously connects to a respective middle portion and bends from each end of the respective middle portion and extends almost in parallel with the central portion. More specifically, each lead-lag and feathering portion has an at least approximately X-shaped cross-section. However, such a cross-section is complicated and elaborate to manufacture and, consequently, expensive, and provides for a comparatively high lead-lag stiffness.

One possibility of simplifying the above-described design of the flexbeam according to EP 1 431 176 A1 would be by simply stacking large layers on top of each other without bending corresponding fiber directions within the planes of respectively used fiber plies. Furthermore, corresponding fibers of respectively applied composite materials should at least essentially extend uninterruptedly between both axial ends of the flexbeam in order to achieve high strengths, especially high fatigue strengths.

The documents US 2015/0158582 A1, U.S. Pat. No. 8,821,128 B1, and CA 2 650 760 A1 describe flexbeams with designs that can be manufactured more easily and, thus, cheaper as well as with comparatively few interrupted fibers. However, these flexbeams provide for a comparatively low flapping stiffness and a comparatively high lead-lag stiffness in a respective torsion weak region having an integrated lead-lag-soft region. Thus, additional structures, such as e.g. flap stops, are required in order to prevent excessive deformation. Furthermore, comparatively long lead-lag-soft regions are required, resulting in higher weight and lower aerodynamic performance of the flexbeams.

If, however, respective fiber layers of the flexbeams according to the documents US 2015/0158582 A1, U.S. Pat. No. 8,821,128 B1, and CA 2 650 760 A1 are stacked high enough in order to achieve a required, sufficiently high flapping stiffness, then corresponding shear centers of the flexbeams which are separated by slots would be comparatively distant from a respective pitching resp. torsion axis of the flexbeam. Such a large distance of the shear centers from the pitching resp. tortion axis nevertheless leads to a high torsional stiffness, especially when a centrifugal load is applied to the flexbeam. The documents EP2832640, US2010278648 and U.S. Pat. No. 5,263,821 were also considered.

BRIEF SUMMARY OF THE INVENTION

It is, therefore, an object of the present invention to provide a new elastic torsion element for connecting a rotor blade to a rotor hub of a rotor. This new elastic torsion element should comprise an integrated elastic lead-lag hinge and should be manufacturable easily and at comparatively low cost.

This object is solved by an elastic torsion element for connecting a rotor blade to a rotor hub of a rotor, the elastic torsion element comprising the features of claim 1.

More specifically, according to the present invention an elastic torsion element for connecting a rotor blade to a rotor hub of a rotor comprises at least two elastically deformable plates. Each one of the at least two elastically deformable plates comprises fiber reinforced polymers. Respective fibers of the fiber reinforced polymers of each one of the at least two elastically deformable plates are at least arranged along one of a first and a second dominant fiber directions, wherein the first dominant fiber direction crosses the second dominant fiber direction in a predetermined fiber direction crossing region. The elastic torsion element comprises an integrated elastic lead-lag hinge that is formed at the predetermined fiber direction crossing region.

According to one aspect, the at least two elastically deformable plates are manufactured as composite plates using glass, basalt, carbon and/or aramid fiber fabrics and rovings that are oriented in different angles with respect to each other. More specifically, in order to enable transfer of comparatively high centrifugal forces and lead-lag as well as flapping bending moments, preferably most of the respective fibers are oriented within +/−15° with respect to a virtual line that is oriented in parallel to a respective pitching resp. torsion axis of the rotor blade.

More specifically, preferably comparatively large roving plies are oriented in different directions between the +/−15° and cross each other in the predetermined fiber direction crossing region. This leads to a comparatively narrow section of the elastic torsion element at said predetermined fiber direction crossing region, where the large roving plies preferably overlap. This comparatively narrow predetermined fiber direction crossing region has a comparatively low lead-lag bending stiffness according to one aspect and, thereby, defines the integrated elastic lead-lag hinge.

According to one aspect, the elastic torsion element further defines an elastic flapping hinge area and the at least two elastically deformable plates become wider and thinner towards the elastic flapping hinge area, which is advantageous for a respective transition into a selected shape of the elastic flapping hinge area. The elastic flapping hinge area preferably exhibits a comparatively high lead-lag stiffness and a comparatively low flapping stiffness.

Advantageously, the at least two elastically deformable plates also become wider and thinner towards an associated rotor blade attachment area, where the elastic torsion element is connected to the rotor blade. Alternatively, the rotor blade attachment area can be implemented by an integrated transition area that transitions into an underlying aerodynamic profile that forms the rotor blade.

According to one aspect, the elastic torsion element and, more specifically, the at least two elastically deformable plates exhibit curved, e.g. U-shaped cross-sections. A respective shear center of such U-shaped cross sections is preferably close to the pitching resp. torsion axis of the rotor blade, respectively of the elastic torsion element. However, an elastically deformable plate that is directly arranged at the pitching resp. torsion axis of the rotor blade preferably merely exhibits a point symmetric cross-sectional shape, e.g. a rectangular shape or an S-shape.

Advantageously, the U-shaped cross-sections can be created by smooth transitions from flat shapes, e.g. shapes that are provided in the elastic flapping hinge area and/or a respective rotor blade attachment area or transition area to the aerodynamic profile, with minimal bending of respective fibers within an underlying plane of the plies. Furthermore, by separating the cross-sections, i.e. each elastically deformable plate, into multiple separate plates, a corresponding torsion resistance of the elastic torsion element can be reduced further. Moreover, both the location of the shear centers and the separation into multiple elastically deformable plates reduce a corresponding Saint Vernant component of torsion stiffness. Preferably, the multiple elastically deformable plates form an overall cross-sectional shape that is similar to a star-shape, which is advantageous for low warping stiffness (a so-called "Wölbsteifigkeit"). Advantageously, the curved U-shaped cross-sections exhibit comparatively high resistance against buckling.

According to one aspect, the integrated elastic lead-lag hinge is arranged in an area of the inventive elastic torsion element that is clearly separated from other areas of the elastic torsion element, such as a respective elastic flapping hinge area, a rotor blade attachment area, or a respective transition area to an associated aerodynamic profile. Preferably, the integrated elastic lead-lag hinge exhibits a low lead-lag stiffness and a high flapping stiffness, i.e. at least a lead-lag stiffness that is smaller than the associated flapping stiffness. Also, preferably, the inventive elastic torsion element exhibits a comparatively low torsion stiffness and a comparatively high resistance against buckling under flapping loads. Moreover, overlapping areas of a respective torsion weak region and the integrated elastic lead-lag hinge are preferably provided.

In a preferred realization of the inventive elastic torsion element, only comparatively few interrupted fibers are required and only comparatively few splicings are necessary. Advantageously, each one of the elastically deformable plates can be manufactured by stacking separate plies vertically, with little or no bending of respective composite fibers within the plane of the plies.

According to one aspect, the inventive elastic torsion element comprises four separate elastically deformable plates that form the integrated elastic lead-lag hinge. Each one of these four elastically deformable plates is preferably implemented with two dominant fiber directions for respective fibers that are provided to transfer at least most of centrifugal forces as well as flapping and lead-lag bending forces that are applied to the elastic torsion element in operation. The two dominant fiber directions preferably cross each other in the predetermined fiber direction crossing region, such that the inventive elastic torsion element is narrowest in the location where the two dominant fiber directions cross each other, and, therefore, overlap. On axial ends of the inventive elastic torsion element towards a respective flapping hinge area, and towards a respective rotor blade attachment area or transition zone to an associated aerodynamic profile, the two dominant fiber directions preferably diverge in order to form areas with only one dominant fiber direction.

Preferably, in order to avoid sharp corners and stepwise transitions, the elastic torsion element is smoothed in selected areas by adding material with interrupted fibers. Furthermore, composite layers with differing orientations and composite fabric layers are added in order to increase a respective in-plane shear stiffness of the inventive elastic torsion element. Moreover, by adding such additional layers, also a bearing laminate can be created that is suitable for application of e.g. bolts and/or rivets, and furthermore excessively thin sections can be avoided and reinforced against buckling.

According to one aspect, the four elastically deformable plates are formed such that they transition from comparatively flat shapes that are embodied adjacent to a respective flapping hinge area of the elastic torsion element into U-shaped cross-sections in an effective area of the integrated elastic lead-lag hinge. Respective shear centers of these cross-sections are preferably close to an underlying pitching resp. torsion axis of the inventive elastic torsion element.

Advantageously, the inventive elastic torsion element has a comparatively easy design so that it can be manufactured easily and in a cost-effective manner. More specifically, it can preferably be embodied by using simple components, i.e. the elastically deformable plates, which are preferentially plate-, strip-, bar- and/or lath-shaped elastic members with simple rectangular cross-sections that may preferably even allow for connection to associated rotor blades with no need for a cross-section change. Such plate-, strip-, bar- and/or lath-shaped elastic members may have a comparatively short length.

Preferably, the plate-, strip-, bar- and/or lath-shaped elastic members are manufactured using fiber composite materials. Preferably, fiber reinforced polymers are used, such as carbon fiber reinforced polymers, glass fiber reinforced polymers, aramid fiber reinforced polymers or basalt fiber reinforced polymers. More specifically, the inventive elastic torsion element and, in particular, its integrated elastic lead-lag hinge preferably comprises two or more elastically deformable plates that are stacked on top of each other. Each one of the at least two elastically deformable plates preferably comprises fiber reinforced polymers.

According to a preferred embodiment, the fiber reinforced polymers comprise carbon, glass, aramid and/or basalt fiber fabrics and rovings.

According to a further preferred embodiment, the respective fibers of the fiber reinforced polymers of each one of the at least two elastically deformable plates are at least essentially oriented within +/−15° with respect to a longitudinal axis of the elastic torsion element.

According to a further preferred embodiment, the respective fibers of the fiber reinforced polymers of each one of the at least two elastically deformable plates are at least arranged along one third dominant fiber direction that crosses at least one of the first dominant fiber direction and the second dominant fiber direction.

According to a further preferred embodiment, the at least two elastically deformable plates comprise at least a first and a second elastically deformable plate that exhibit at least approximately an arc-shaped cross-section in a respective elastic lead-lag hinge area of the integrated elastic lead-lag hinge.

According to a further preferred embodiment, the at least two elastically deformable plates comprise at least one third elastically deformable plate that is arranged between the first and second elastically deformable plates and exhibits a point symmetric cross-section in the respective elastic lead-lag hinge area.

According to a further preferred embodiment, the at least one third elastically deformable plate exhibits a rectangular cross-section in the respective elastic lead-lag hinge area.

According to a further preferred embodiment, the at least one third elastically deformable plate exhibits at least approximately an S-shaped cross-section in the respective elastic lead-lag hinge area.

According to a further preferred embodiment, the at least approximately arc-shaped cross-section in the respective elastic lead-lag hinge area of the integrated elastic lead-lag hinge transitions along a longitudinal axis of the elastic torsion element towards an elastic flapping hinge area into a flat cross-section.

According to a further preferred embodiment, the at least approximately arc-shaped cross-section in the respective elastic lead-lag hinge area of the integrated elastic lead-lag hinge transitions along a longitudinal axis of the elastic torsion element towards a rotor blade attachment area or transition zone into a flat cross-section.

According to a further preferred embodiment, the integrated elastic lead-lag hinge is formed by a narrowest cross-section area of the elastic torsion element.

According to a further preferred embodiment, the at least two elastically deformable plates comprise at least two upper elastically deformable plates and at least two lower elastically deformable plates, wherein the at least two lower elastically deformable plates are arranged in reflection symmetry to the at least two lower elastically deformable plates.

According to a further preferred embodiment, the at least two lower elastically deformable plates are attached to the at least two lower elastically deformable plates by means of a bolted connection, the bolted connection being provided at least approximately at a longitudinal axis of the elastic torsion element.

According to a further preferred embodiment, at least one first and one second elastically deformable plates of the at least two elastically deformable plates are integrated into a single slotted elastically deformable plate, wherein the at least one first and one second elastically deformable plates are at least partly separated in the single slotted elastically deformable plate by means of an associated separating slot.

The present invention further provides a rotary wing aircraft with at least one rotor that comprises at least two rotor blades, and with a rotor hub, each one of the at least two rotor blades being connected to the rotor hub via an elastic torsion element that is embodied as described above.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
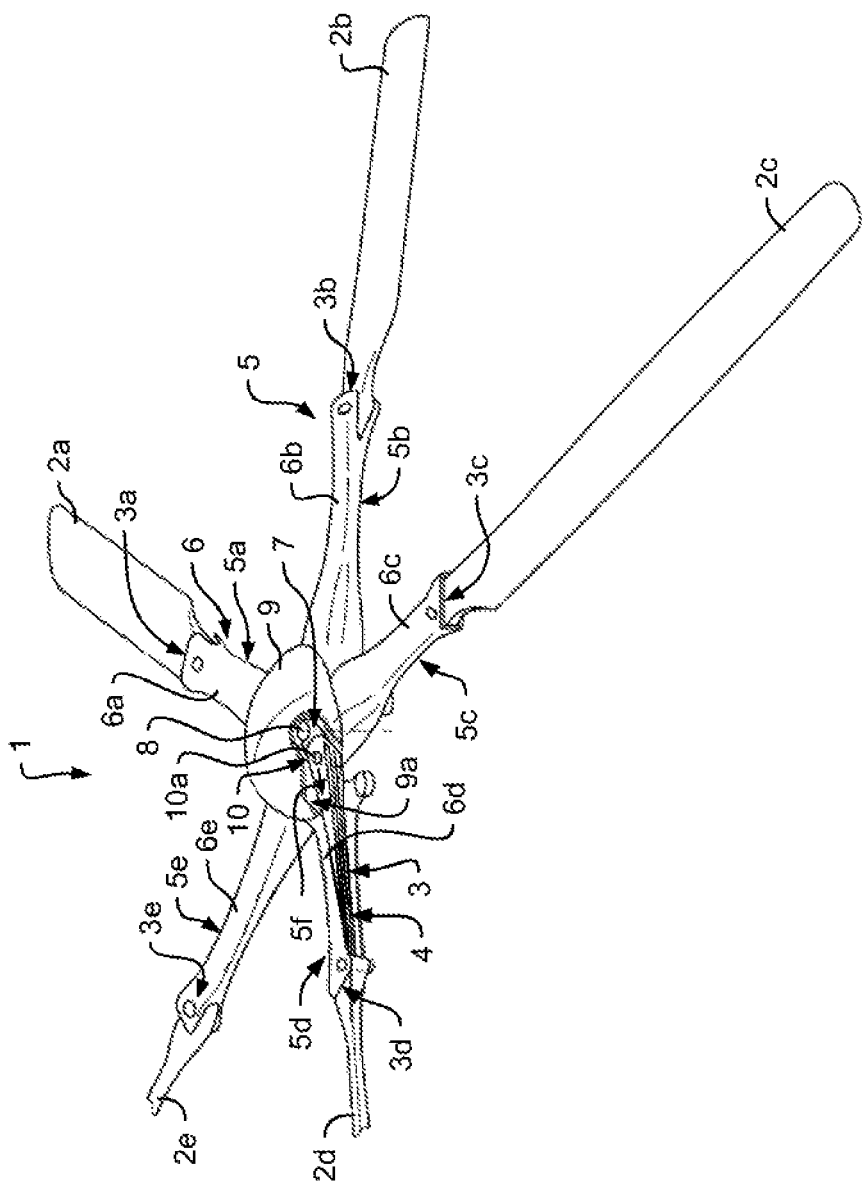
FIG. 1 shows a partially perspective top view of a multi-blade rotor having at least one elastic torsion element according to the invention.

FIG. 1 shows a multi-blade rotor 1 of a rotary wing aircraft, in particular a multi-blade rotor for a main rotor of a helicopter. The multi-blade rotor 1 illustratively comprises a rotor shaft 8 that is embodied with a rotor hub 7. Furthermore, a rotor head covering cap 9 is provided for covering a central portion of the multi-blade rotor 1, which comprises the rotor hub 7 and which illustratively defines an associated rotor head. The rotor head covering cap 9 is shown with an illustrative cut-out 9a, where the rotor head covering cap 9 is partially cut away in order to permit amongst others the illustration of the rotor hub 7.

The multi-blade rotor 1 is preferably embodied as a bearingless rotor having a multiplicity of elastic hinge units 3 as interfaces between the rotor shaft 8, i.e. the rotor hub 7, and a plurality of rotor blades 2a, 2b, 2c, 2d, 2e. It should, however, be noted that these rotor blades 2a, 2b, 2c, 2d, 2e are not shown in greater detail, neither in FIG. 1 nor in the remaining figures, for simplicity and clarity of the drawings. Furthermore, it should be noted that the expression "multi-blade rotor" should be construed in the context of the present invention such that it encompasses all rotors having at least two rotor blades.

The multiplicity of elastic hinge units 3 preferably implements a multiplicity of elastic torsion elements 5, i.e. elastic torsion elements 5a, 5b, 5c, 5d, 5e. It should, however, be noted that for simplicity and clarity of the drawings only a single elastic hinge unit of the multiplicity of elastic hinge units is designated with the reference number 3 and described representatively hereinafter for all elastic hinge units of the multiplicity of elastic hinge units, which are preferably at least similarly embodied.

More specifically, the multiplicity of elastic hinge units defines a predetermined number of elastic torsion elements 5a, 5b, 5c, 5d, 5e of the multi-blade rotor 1, such that each one of the elastic torsion elements 5a, 5b, 5c, 5d, 5e is associated with a given rotor blade of the plurality of rotor blades 2a, 2b, 2c, 2d, 2e. Furthermore, the elastic torsion elements 5a, 5b, 5c, 5d, 5e preferably comprise a plurality of hub connecting points 10 for connection to the rotor hub 7. For simplicity and clarity of the drawings, however, only a single hub connecting point of the elastic torsion element 5d is designated with the reference sign 10a. Moreover, each one of the elastic torsion elements 5a, 5b, 5c, 5d, 5e preferably comprises one or more blade connecting points 3a, 3b, 3c, 3d, 3e for connection to an associated one of the rotor blades 2a, 2b, 2c, 2d, 2e. Illustratively, the rotor blades 2a, 2b, 2c, 2d, 2e are connected to the elastic torsion elements 5a, 5b, 5c, 5d, 5e at the blade connecting points 3a, 3b, 3c, 3d, 3e and can be disconnected therefrom, if required.

However, according to one aspect the rotor blades 2a, 2b, 2c, 2d, 2e and the elastic torsion elements 5a, 5b, 5c, 5d, 5e, i.e. the multiplicity of elastic hinge units 3, can also be implemented as integral components, so that they could not be disconnected from each other. In this case, the blade connecting points 3a, 3b, 3c, 3d, 3e merely define virtual transition points resp. transition zones to associated aerodynamic profiles that form the rotor blades 2a, 2b, 2c, 2d, 2e.

Each one of the elastic torsion elements 5a, 5b, 5c, 5d, 5e is preferably further associated with a control cuff of a multiplicity of control cuffs 6, i.e. control cuffs 6a, 6b, 6c, 6d, 6e. These control cuffs 6a, 6b, 6c, 6d, 6e are preferably adapted for setting in operation of the multi-blade rotor 1 a current pitch or blade angle of the rotor blades 2a, 2b, 2c, 2d, 2e by controlling a current torsion of the elastic torsion elements 5a, 5b, 5c, 5d, 5e, i.e. of the multiplicity of elastic hinge units. For instance, the control cuff 6d is driveable for setting the current pitch or blade angle of the rotor blade 2d by controlling the current torsion of the elastic torsion element 5d, i.e. the current torsion of the elastic hinge unit 3.

According to one aspect, the elastic torsion element 5d comprises at least an integrated elastic lead-lag hinge 4 that is illustratively provided for enabling lead-lag motions of the rotor blade 2d relative to the rotor hub 7. Optionally, the elastic torsion element 5d may further comprise an elastic flapping hinge area (13b in FIG. 2). Illustratively, the elastic torsion element 5d defines a longitudinal direction 5f directed, by way of example, from the rotor shaft 8 to its blade connecting point 3d.

Figure 2:
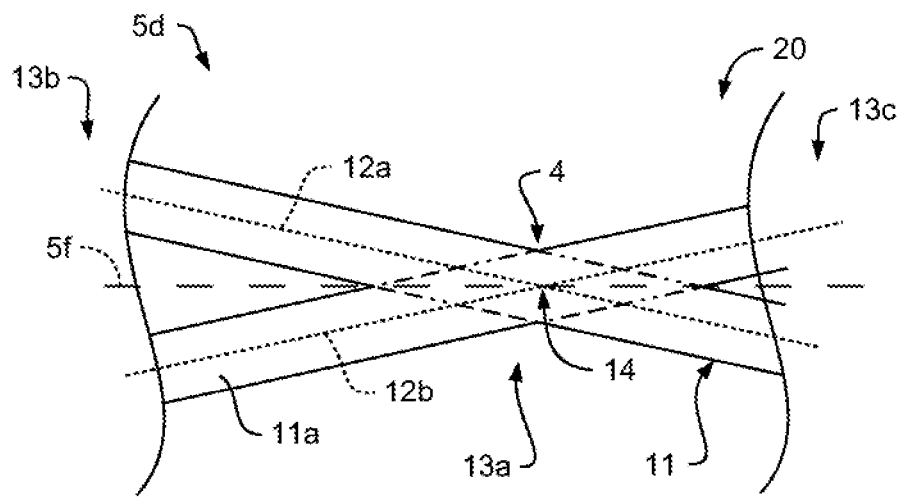
FIG. 2 shows a top view of a partial laminate of a selected one of the elastic torsion elements of FIG. 1, comprising only uninterrupted fibers following dominant fiber directions.

FIG. 2 shows the elastic torsion element 5d with the integrated elastic lead-lag hinge 4 of FIG. 1. The elastic torsion element 5d has the longitudinal axis 5f of FIG. 1 and is representatively illustrated for all elastic torsion elements of FIG. 1. In other words, all elastic torsion elements 5a, 5b, 5c, 5d, 5e of the multi-blade rotor 1 of FIG. 1 are preferably identically formed, at least within usual predetermined manufacturing tolerances.

According to one aspect, the elastic torsion element 5d comprises a multiplicity of elastically deformable plates 11. More specifically, the elastic torsion element 5d preferably comprises at least two elastically deformable plates 11a (and 11b in FIG. 4 and FIG. 5). Illustratively, and due to a selected viewing direction in FIG. 2, however, only the elastically deformable plate 11a of the multiplicity of elastically deformable plates 11 is shown.

By way of example, the elastic torsion element 5d is only shown as partial laminate 20, which illustratively only comprises uninterrupted fibers following predetermined dominant fiber directions. More specifically, the elastically deformable plate 11a preferably comprises fiber reinforced polymers. For instance, the fiber reinforced polymers comprise carbon, glass, aramid and/or basalt fiber fabrics and rovings. According to one aspect, respective fibers of the fiber reinforced polymers of the elastically deformable plate 11a are preferably uninterrupted and selectively arranged along one of at least two dominant fiber directions 12a, 12b. However, while FIG. 2 only shows a first and a second dominant fiber direction 12a, 12b, provision of more than these two dominant fiber directions 12a, 12b is likewise contemplated, as illustrated by way of example in FIG. 6. Preferably, the respective fibers of the fiber reinforced polymers of the elastically deformable plate 11a are at least essentially oriented with +/−15° with respect to the longitudinal axis 5f of the elastic torsion element 5d.

According to one aspect, the first dominant fiber direction 12a crosses the second dominant fiber direction 12b in a predetermined fiber direction crossing region 14. At the predetermined fiber direction crossing region 14, preferably the integrated elastic lead-lag hinge 4 of the elastic torsion element 5d is formed. Preferentially, the integrated elastic lead-lag hinge 4 is formed by a narrowest cross-section area of the elastic torsion element 5d. By way of example, this narrowest cross-section is formed by the predetermined fiber direction region 14.

It should be noted that the elastic torsion element 5d is only illustrated partly in FIG. 2 for clarity and simplicity of the representation, in order to illustrate a preferred configuration of the integrated elastic lead-lag hinge 4. The integrated elastic lead-lag hinge 4 is illustratively arranged in an associated elastic lead-lag hinge are 13a of the elastic torsion element 5d. However, the latter preferably also comprises an optional elastic flapping hinge area 13b and a rotor blade attachment area 13c, i.e. a transition zone 13c to a respective aerodynamic profile.

Figure 3:
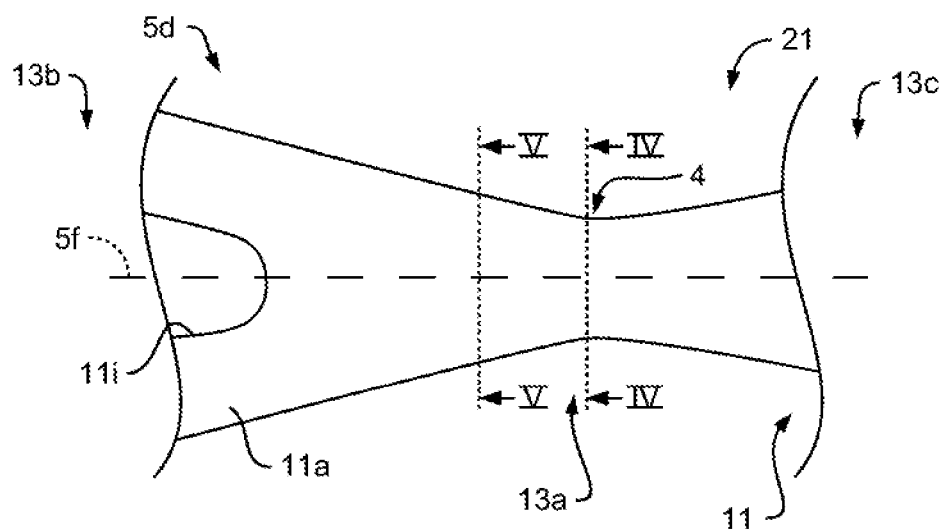
FIG. 3 shows a top view of a full laminate of the elastic torsion element of FIG. 2 with the uninterrupted fibers, as well as with interrupted fibers and spliced plies.

FIG. 3 shows the elastic torsion element 5d of FIG. 2 with the longitudinal axis 5f and the elastically deformable plate 11a. Again, the elastic torsion element 5d is only partly illustrated by means of the elastic lead-lag hinge area 13a, where the integrated elastic lead-lag hinge 4 of FIG. 2 is located. However, the elastic flapping hinge area 13b and the rotor blade attachment area or transition zone to an associated aerodynamic profile 13c are, similar to FIG. 2, not illustrated in greater detail.

In contrast to FIG. 2, the elastic torsion element 5d is now shown as full laminate 21 including the dominant uninterrupted fibers as described above with reference to FIG. 2, as well as interrupted fibers and spliced plies. These interrupted fibers and spliced plies preferably round off sharp corners, create smooth transitions, increase a respective in-plane shear strength, and avoid excessively low thicknesses of the elastic torsion element 5d. Accordingly, in contrast to the partial laminate 20 of FIG. 2, the full laminate 21 of FIG. 3 is illustrated with respectively rounded edges.

By way of example, the elastic torsion element 5d and, illustratively, the elastically deformable plate 11a now comprises an opening 11i. However, this opening 11i is optional and not mandatory, so that this opening 11i can likewise be omitted.

Figure 4:
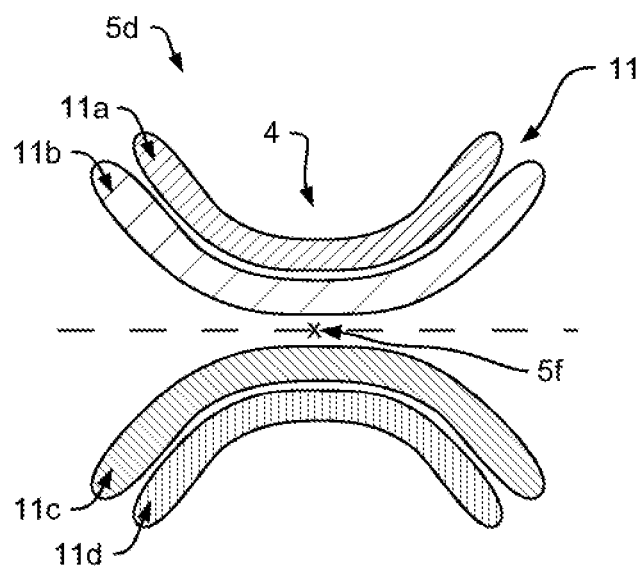
FIG. 4 shows a cut view of the full laminate of FIG. 3, seen along a cut line IV-IV in FIG. 3.

FIG. 4 shows the elastic torsion element 5d with the longitudinal axis 5f of FIG. 3 for further illustrating the multiplicity of elastically deformable plates 11 of FIG. 3. As described above with reference to FIG. 2, the multiplicity of elastically deformable plates 11 preferably comprises at least two and, preferentially, four elastically deformable plates 11a, 11b, 11c, 11d.

According to one aspect, the elastically deformable plate 11a and, preferably, each one of the elastically deformable plates 11a, 11b, 11c, 11d exhibits at least approximately an arc-shaped, i.e. curved cross-section. Preferably, each one of the elastically deformable plates 11a, 11b, 11c, 11d, exhibits this at least approximately arc-shaped cross-section at least in an associated elastic lead-lag hinge area (13a in FIG. 2 and FIG. 3) of the integrated elastic lead-lag hinge 4, as illustrated in FIG. 4. In other words, each one of the elastically deformable plates 11a, 11b, 11c, 11d is at least partly U-shaped.

In FIG. 4, the elastically deformable plates 11a, 11b form illustratively upper deformable plates, while the elastically deformable plates 11c, 11d illustratively form lower deformable plates, both with respect to the longitudinal axis 5f of the elastic torsion element 5d. According to one aspect, the lower elastically deformable plates 11c, 11d are arranged in reflection symmetry to the upper elastically deformable plates 11a, 11b.

Figure 5:
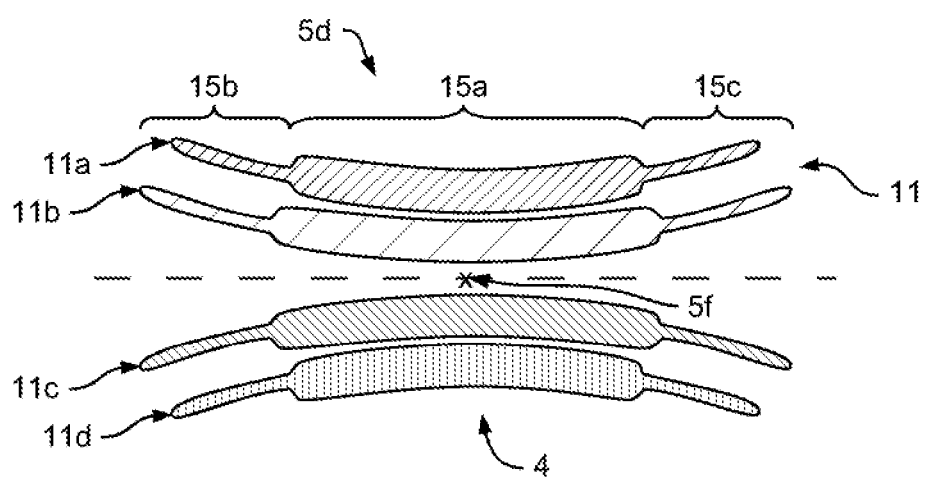
FIG. 5 shows a cut view of the full laminate of FIG. 3, seen along a cut line V-V in FIG. 3.

FIG. 5 shows the elastically deformable plates 11a, 11b, 11c, 11d of the multiplicity of elastically deformable plates 11 of FIG. 4 of the integrated elastic lead-lag hinge 4 of FIG. 3. However, the elastically deformable plates 11a, 11b, 11c, 11d are in contrast to FIG. 4 now illustrated in a location that is closer to the elastic flapping hinge area 13b of FIG. 3.

As can be seen from FIG. 5, each one of the elastically deformable plates 11a, 11b, 11c, and 11d is less curved than in FIG. 4. Furthermore, each one of the elastically deformable plates 11a, 11b, 11c, 11d now comprises a dominant fiber direction overlapping area 15a, where the dominant fiber directions 12a, 12b of FIG. 2 overlap each other, as well as single dominant fiber direction areas 15b, 15c. In other words, when looking at FIG. 5 in combination with FIG. 2, it becomes clear that the unidirectional fibers coming from the single dominant fiber direction areas 15b, 15c cross each other in the dominant fiber directions overlapping area 15a, thereby thickening this overlapping area 15a compared to the single dominant fiber direction areas 15b, 15c.

According to one aspect, the arc-shaped cross-section of the elastically deformable plates 11a, 11b, 11c, 11d is flattened with respect to FIG. 4, as described above. According to one aspect, this flattening continues in direction of the elastic flapping hinge area 13b of FIG. 3. Thus, the integrated elastic lead-lag hinge 4 preferably transitions along the longitudinal axis 5f of the elastic torsion element 5d from the elastic lead-lag hinge area 13a of FIG. 3 towards the elastic flapping hinge area 13b of FIG. 3 from the arc-shaped cross-section into a flat cross-section. Likewise, the arc-shaped cross-section of the elastically deformable plates 11a, 11b, 11c, 11d in the elastic lead-lag hinge area 13a of FIG. 3 of the integrated elastic lead-lag hinge 4 preferably transitions along the longitudinal axis 5f of the elastic torsion element 5d towards the rotor blade attachment area or transition zone 13c of FIG. 3 into a flat cross-section. It should be noted that this is exemplarily further illustrated in FIG. 11.

Figure 6:
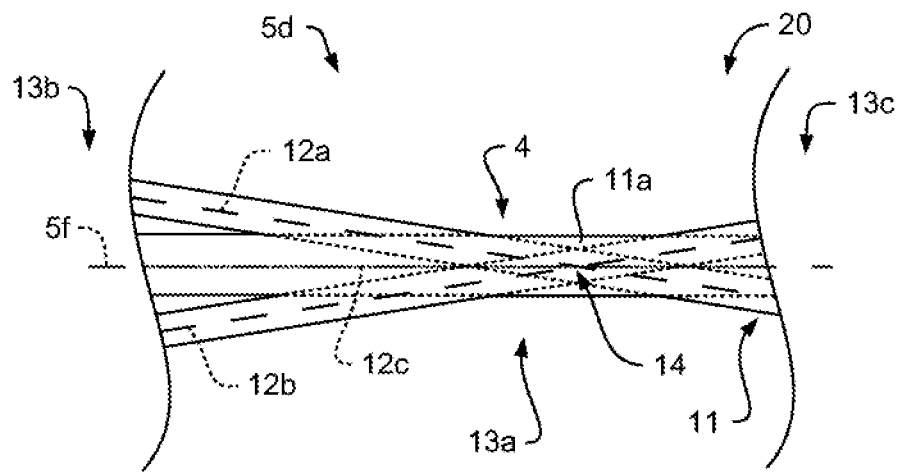
FIG. 6 shows a top view of a partial laminate of an alternative elastic torsion element having uninterrupted fibers following dominant fiber directions.

FIG. 6 shows the elastic torsion element 5d of FIG. 2, i.e. the partial laminate 20 of uninterrupted fibers that follow the dominant fiber directions 12a, 12b of FIG. 2. However, in contrast to FIG. 2, selected fibers of the fiber reinforced polymers that form the elastically deformable plate 11a are according to one aspect now arranged along at least one third dominant fiber direction 12c. This at least one third dominant fiber direction 12c preferably crosses the other two dominant fiber directions 12e, 12b, preferentially in the fiber direction crossing region 14 of FIG. 2.

Figure 7:
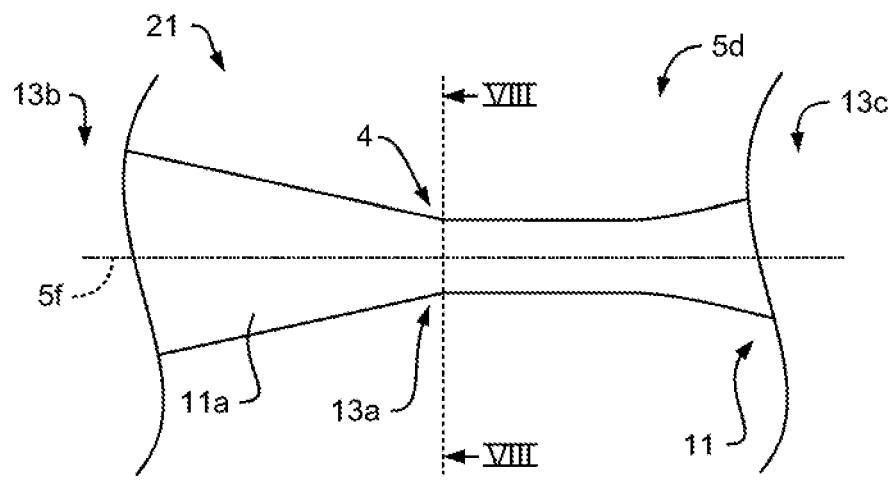
FIG. 7 shows a top view of a full laminate of the elastic torsion element of FIG. 6 with the uninterrupted fibers, as well as with interrupted fibers and spliced plies.

FIG. 7 shows the elastic torsion element 5d according to FIG. 6. However, in contrast to FIG. 6 and in analogy to FIG. 3, the elastic torsion element 5d is now illustrated as full laminate 21 with the dominant uninterrupted fibers that are arranged along the three dominant fiber directions 12a, 12b, 12c of FIG. 6. The full laminate 21 also comprises interrupted fibers and spliced plies, which round off respective sharp corners, create smooth transitions, increase a respective in-plane shear strength of the elastic torsion element 5d, and avoid excessively low thicknesses thereof.

Figure 8:
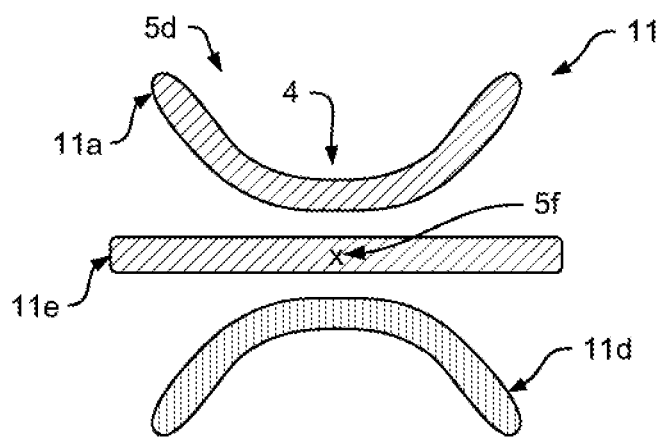
FIG. 8 shows a cut view of the full laminate of FIG. 6, seen along a cut line VIII-VIII of FIG. 7.

FIG. 8 shows the multiplicity of elastically deformable plates 11 of FIG. 6 and FIG. 7, or of FIG. 2 and FIG. 3, according to a variant with only three elastically deformable plates, i.e. the elastically deformable plates 11a, 11d of FIG. 4, and an additional elastically deformable plate 11e. The elastically deformable plates 11a, 11b are illustratively embodied according to FIG. 4 and arranged in reflection symmetry. The elastically deformable plate 11e is according to one aspect arranged between the elastically deformable plates 11a, 11d.

Preferably, the elastically deformable plate 11e exhibits a point symmetric cross-section, preferentially at least in the elastic lead-lag hinge area 13a of FIG. 2, FIG. 3, FIG. 6 and FIG. 7. More specifically, the elastically deformable plate 11e exemplarily defines a rectangular cross-section.

Figure 9:
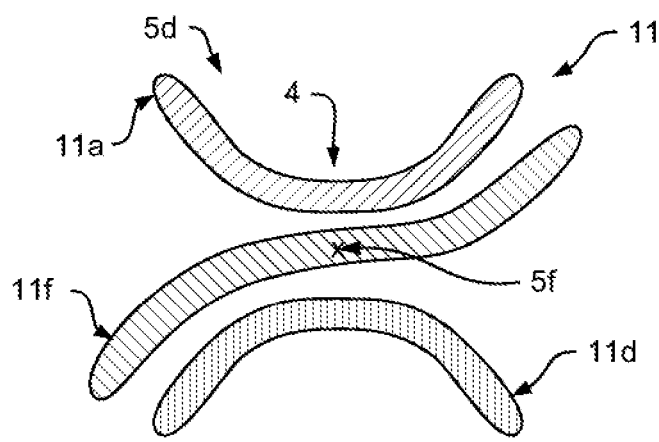
FIG. 9 shows the cut view of FIG. 8 according to a first variant.

FIG. 9 shows the elastic torsion element 5d of FIG. 8 with the elastically deformable plates 11a, 11d. However, in contrast to FIG. 8 the elastically deformable plate 11e of FIG. 8 with the rectangular cross-section is now exemplarily replaced by an elastically deformable plate 11f, which is still point symmetric, but illustratively exhibits at least approximately an S-shaped cross-section in the elastic lead-lag hinge area 13a of FIG. 2, FIG. 3, FIG. 6 and FIG. 7.

Figure 10:
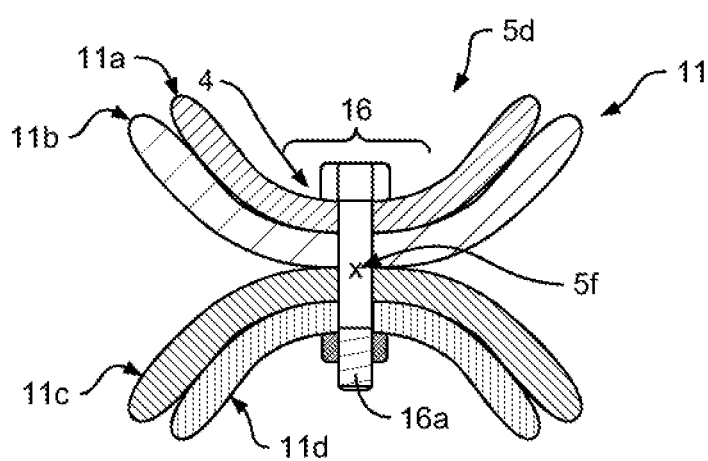
FIG. 10 shows the cut view of FIG. 8 according to a second variant.

FIG. 10 shows the elastic torsion element 5d of FIG. 4 with the multiplicity of elastically deformable plates 11 that comprises the elastically deformable plates 11a, 11b, 11c, 11d of FIG. 4. However, in contrast to FIG. 4, the elastically deformable plates 11a, 11b, 11c, 11d are now rigidly mounted to each other by means of a bolted connection 16. According to one aspect, the bolted connection 16 is formed by means of an exemplary connection bolt 16a at least in close proximity and, preferably, in the region of the longitudinal axis 5f of the elastic torsion element 5d.

Figure 11:
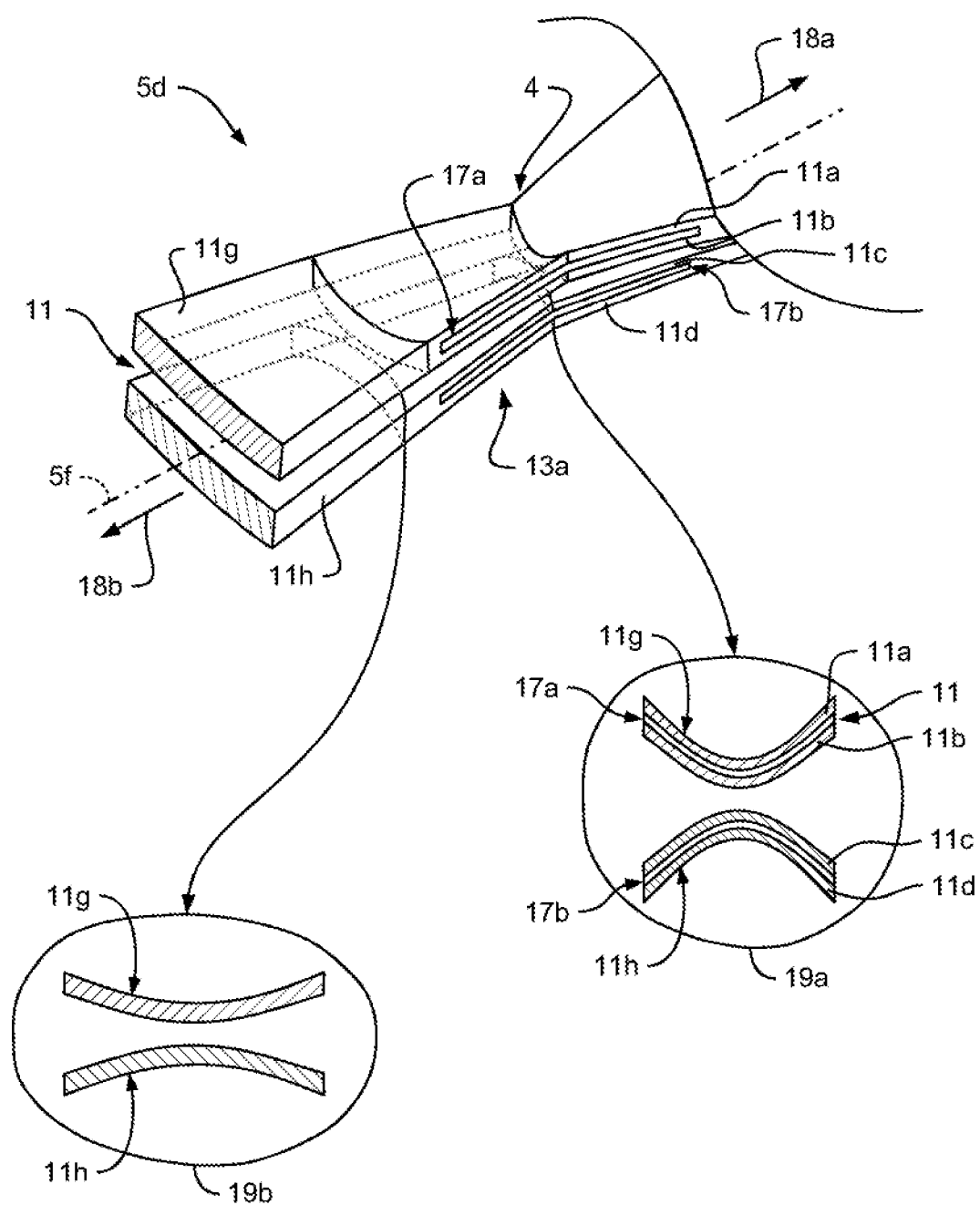
FIG. 11 shows a partially perspective top view of a selected one of the elastic torsion elements of FIG. 1, according to still another variant of the present invention.

FIG. 11 shows the elastic torsion element 5d of FIG. 2 to FIG. 5 with its longitudinal axis 5f and with the multiplicity of elastically deformable plates 11 that comprises according to FIG. 4 and FIG. 5 the elastically deformable plates 11a, 11b, 11c, 11d. The elastic torsion element 5d is again only partly shown and illustrated with a direction 18a that exemplarily points towards the rotor blade attachment area or transition zone 13c of FIG. 2 and FIG. 3, as well as a direction 18b that points towards the elastic flapping hinge area 13b of FIG. 2 and FIG. 3.

However, in contrast to FIG. 4 and FIG. 5, the elastically deformable plates 11a, 11b are now preferably integrated into a single slotted elastically deformable plate 11g. More specifically, according to one aspect the elastically deformable plates 11a, 11b are at least partly separated in the single slotted elastically deformable plate 11g by means of an associated separating gap or slot 17a. This associated separating gap or slot 17a is preferably at least provided in the elastic lead-lag hinge area 13a of the elastic torsion element 5d, i.e. at the integrated elastic lead-lag hinge 4 thereof. Illustratively, the associated separating gap or slot 17a is only provided in a central portion of the elastic lead-lag hinge area 13a, i.e. preferably not in transition regions towards the rotor blade attachment area or transition zone 13c of FIG. 2 and FIG. 3, as well as towards the elastic flapping hinge area 13b of FIG. 2 and FIG. 3.

Likewise, the elastically deformable plates 11c, 11d are preferably integrated into a single slotted elastically deformable plate 11h. More specifically, according to one aspect the elastically deformable plates 11c, 11d are at least partly separated in the single slotted elastically deformable plate 11h by means of an associated separating gap or slot 17b. This associated separating gap or slot 17b is preferably also at least provided in the elastic lead-lag hinge area 13a of the elastic torsion element 5d, i.e. at the integrated elastic lead-lag hinge 4 thereof. Illustratively, the associated separating gap or slot 17b is only provided in a central portion of the elastic lead-lag hinge area 13a, i.e. preferably not in transition regions towards the rotor blade attachment area or transition zone 13c of FIG. 2 and FIG. 3, as well as towards the elastic flapping hinge area 13b of FIG. 2 and FIG. 3.

For further illustrating the separating gaps or slots 17a, 17b, a cut view of the central section of the elastic lead-lag hinge area 13a is shown in enlarged form in a detail view 19a. Moreover, for further illustrating the slotted elastically deformable plates 11g, 11h outside of this central section, i.e. by way of example in the transition region towards the elastic flapping hinge area 13b of FIG. 2 and FIG. 3, a further enlarged cut view 19b is also shown.

It should be noted that the above described embodiments are merely described to illustrate possible realizations of the present invention, but not in order to restrict the present invention thereto. Instead, multiple modifications and variations of the invention are possible and should, therefore, also be considered as being part of the invention.

By way of example, the two upper elastically deformable plates 11a, 11b of FIG. 4 may be replaced with the single slotted elastically deformable plate 11g of FIG. 11. Likewise, the two lower elastically deformable plates 11c, 11d of FIG. 4 may be replaced with the single slotted elastically deformable plate 11h of FIG. 11. Moreover, the slotted elastically deformable plates 11g, 11h of FIG. 11 may be attached to each other by means of the bolted connection 16 according to FIG. 10. Furthermore, the flat elastically deformable plate 11e of FIG. 8 can be introduced between the slotted elastically deformable plates 11g, 11h of FIG. 11. This similarly applies to the S-shaped elastically deformable plate 11f of FIG. 9, that may likewise be introduced between the slotted elastically deformable plates 11g, 11h of FIG. 11. Moreover, also the configurations of FIG. 8 and FIG. 9 may be provided with the bolted connection 16 of FIG. 10, and so on.

REFERENCE LIST 1 multi-blade rotor
2a, 2b, 2c, 2d, 2e rotor blades
3 elastic hinge unit
3a, 3b, 3c, 3d, 3e blade connecting points
4 integrated elastic lead-lag hinge
5 multiplicity of elastic torsion elements
5a, 5b, 5c, 5d, 5e elastic torsion elements
5f elastic torsion element longitudinal axis
6 multiplicity of control cuffs
6a, 6b, 6c, 6d, 6e control cuffs
7 rotor hub
8 rotor shaft
9 rotor head covering cap
9a rotor head covering cap cut-out
10 plurality of hub connecting points
10a hub connecting point
11 multiplicity of elastically deformable plates
11a, 11b, 11c, 11d partly U-shaped elastically deformable plates
11e flat elastically deformable plate
11f S-shaped elastically deformable plate
11g, 11h slotted elastically deformable plates
11i plate opening
12a, 12b, 12c dominant fiber directions
13a elastic lead-lag hinge area
13b elastic flapping hinge area
13c rotor blade attachment area or transition zone
14 fiber direction crossing region
15a dominant fiber directions overlapping area
15b, 15c single dominant fiber direction area
16 bolted connection
16a connection bolt
17a, 17b separating gaps or slots 18a direction towards rotor blade attachment area or transition zone
18b direction towards elastic flapping hinge area
19a cut view of central section at elastic lead-lag hinge area
19b cut view of intermediate section between elastic lead-lag hinge area and rotor blade attachment area or transition zone
20 partial laminate of uninterrupted fibers following dominant fiber directions
21 full laminate including dominant uninterrupted fibers, interrupted fibers and spliced plies

What is claimed is:

1. An elastic torsion element for connecting a rotor blade to a rotor hub of a rotor, the elastic torsion element comprising at least two elastically deformable plates, wherein each one of the at least two elastically deformable plates comprises fiber reinforced polymers, wherein respective fibers of the fiber reinforced polymers of each one of the at least two elastically deformable plates are at least arranged along one of a first and a second dominant fiber directions, wherein the first dominant fiber direction crosses the second dominant fiber direction in a predetermined fiber direction crossing region, and wherein the elastic torsion element comprises an integrated elastic lead-lag hinge that is formed at the predetermined fiber direction crossing region.

2. The elastic torsion element of claim 1,
wherein the fiber reinforced polymers comprise at least one of carbon, glass, aramid fiber fabrics, basalt fiber fabrics and rovings.

3. The elastic torsion element of claim 2, wherein the respective fibers of the fiber reinforced polymers of each one of the at least two elastically deformable plates are oriented within +/−15° with respect to a longitudinal axis of the elastic torsion element.

4. The elastic torsion element of claim 1,
wherein respective fibers of the fiber reinforced polymers of each one of the at least two elastically deformable plates are at least arranged along one third dominant fiber direction that crosses at least one of the first dominant fiber direction and the second dominant fiber direction.

5. The elastic torsion element of claim 1,
wherein the at least two elastically deformable plates comprise at least a first and a second elastically deformable plate that exhibit at least approximately an arc-shaped cross-section in a respective elastic lead-lag hinge area of the integrated elastic lead-lag hinge.

6. The elastic torsion element of claim 5,
wherein the at least two elastically deformable plates comprise at least one third elastically deformable plate that is arranged between the first and second elastically deformable plates and exhibits a point symmetric cross-section in the respective elastic lead-lag hinge area.

7. The elastic torsion element of claim 6, wherein the at least one third elastically deformable plate exhibits a rectangular cross-section in the respective elastic lead-lag hinge area.

8. The elastic torsion element of claim 6, wherein the at least one third elastically deformable plate exhibits at least approximately an S-shaped cross-section in the respective elastic lead-lag hinge area.

9. The elastic torsion element of claim 5,
wherein the at least approximately arc-shaped cross-section in the respective elastic lead-lag hinge area of the integrated elastic lead-lag hinge transitions along a longitudinal axis of the elastic torsion element towards an elastic flapping hinge area into a flat cross-section.

10. The elastic torsion element of claim 5,
wherein the at least approximately arc-shaped cross section in the respective elastic lead-lag hinge area of the integrated elastic lead-lag hinge transitions along a longitudinal axis of the elastic torsion element towards a rotor blade attachment area or transition zone into a flat cross-section.

11. The elastic torsion element of claim 1,
wherein the integrated elastic lead-lag hinge is formed by a narrowest cross-section area of the elastic torsion element.

12. The elastic torsion element of claim 1,
wherein the at least two elastically deformable plates comprise at least two upper elastically deformable plates and at least two lower elastically deformable plates, and wherein the at least two lower elastically deformable plates are arranged in reflection symmetry to the at least two lower elastically deformable plates.

13. The elastic torsion element of claim 12,
wherein the at least two lower elastically deformable plates are attached to the at least two lower elastically deformable plates by means of a bolted connection, the bolted connection being provided at least approximately at a longitudinal axis of the elastic torsion element.

14. The elastic torsion element of claim 1,
wherein at least one first and one second elastically deformable plates of the at least two elastically deformable plates are integrated into a single slotted elastically deformable plate, and wherein the at least one first and one second elastically deformable plates are at least partly separated in the single slotted elastically deformable plate by means of an associated separating slot.

15. A rotary wing aircraft with at least one rotor that comprises at least two rotor blades, and with a rotor hub, each one of the at least two rotor blades being connected to the rotor hub via an elastic torsion element that is embodied according to claim 1.

16. An elastic torsion element for connecting a rotor blade to a rotor hub of a rotor, the elastic torsion element comprising two elastically deformable plates, wherein each one of the two elastically deformable plates comprises fiber reinforced polymers, wherein respective fibers of the fiber reinforced polymers of each one of the two elastically deformable plates are arranged along one of a first dominant fiber direction and a second dominant fiber direction, wherein the first dominant fiber direction crosses the second dominant fiber direction in a predetermined fiber direction crossing region forming an integrated elastic lead-lag hinge at the predetermined fiber direction crossing region.

17. The elastic torsion element of claim 16,
wherein the fiber reinforced polymers are made of at least one of carbon, glass, aramid and basalt, the respective fibers of the fiber reinforced polymers of each one of the two elastically deformable plates are oriented within +/−15° with respect to a longitudinal axis of the elastic torsion element, and the integrated elastic lead-lag hinge is formed by a narrowest cross-section area of the elastic torsion element.

18. The elastic torsion element of claim 16,
wherein respective fibers of the fiber reinforced polymers of each one of the two elastically deformable plates are arranged along one third dominant fiber direction that crosses at least one of the first dominant fiber direction and the second dominant fiber direction.

19. The elastic torsion element of claim 16,
wherein the first and second elastically deformable plates exhibit an arc-shaped cross-section in a respective elastic lead-lag hinge area of the integrated elastic lead-lag hinge and further comprising a third elastically deformable plate between the first and second elastically deformable plates and exhibiting a point symmetric cross-section in the respective elastic lead-lag hinge area.

20. The elastic torsion element of claim 16, further comprising a third elastically deformable plate and a fourth elastically deformable plate, wherein the first, second third and fourth elastically deformable plates comprise two upper elastically deformable plates and two lower elastically deformable plates, and wherein the two lower elastically deformable plates are arranged in reflection symmetry to the two lower elastically deformable plates and wherein the two lower elastically deformable plates are attached to the two lower elastically deformable plates by a mechanical connection, the mechanical connection being provided at least approximately at a longitudinal axis of the elastic torsion element.

* * * * *